United States Patent [19]
Gannett

[11] 3,965,297
[45] June 22, 1976

[54] SECRET COMMUNICATION SIGNAL GENERATING SYSTEM

[75] Inventor: Danforth K. Gannett, Mountain Lakes, N.J.

[73] Assignee: Bell Telephone Laboratories, Incorporated, Murray Hill, N.J.

[22] Filed: May 1, 1946

[21] Appl. No.: 666,282

[52] U.S. Cl.............................. 179/1.5 R; 331/78
[51] Int. Cl.² ...................... H04K 1/00; H04L 9/04
[58] Field of Search......................... 179/15; 178/22; 250/27 PS

*Primary Examiner*—Howard A. Birmiel
*Attorney, Agent, or Firm*—H. A. Burgess

EXEMPLARY CLAIM

1. A key generating circuit for constructing a six-valued key by combination of signals of smaller ranges of values comprising means to produce two-valued signals of highly irregular occurrence, one signal having the values 0 and 1 unit, and the other having the values 0 and 3 units, means to produce a three-valued signal having the values 0 and 2 and 4 units occurring in irregular sequence, means to combine all of said signals in additive manner, and means effective when the summation signal has the value 6 units or a greater value for reducing such value by 6 units.

6 Claims, 4 Drawing Figures

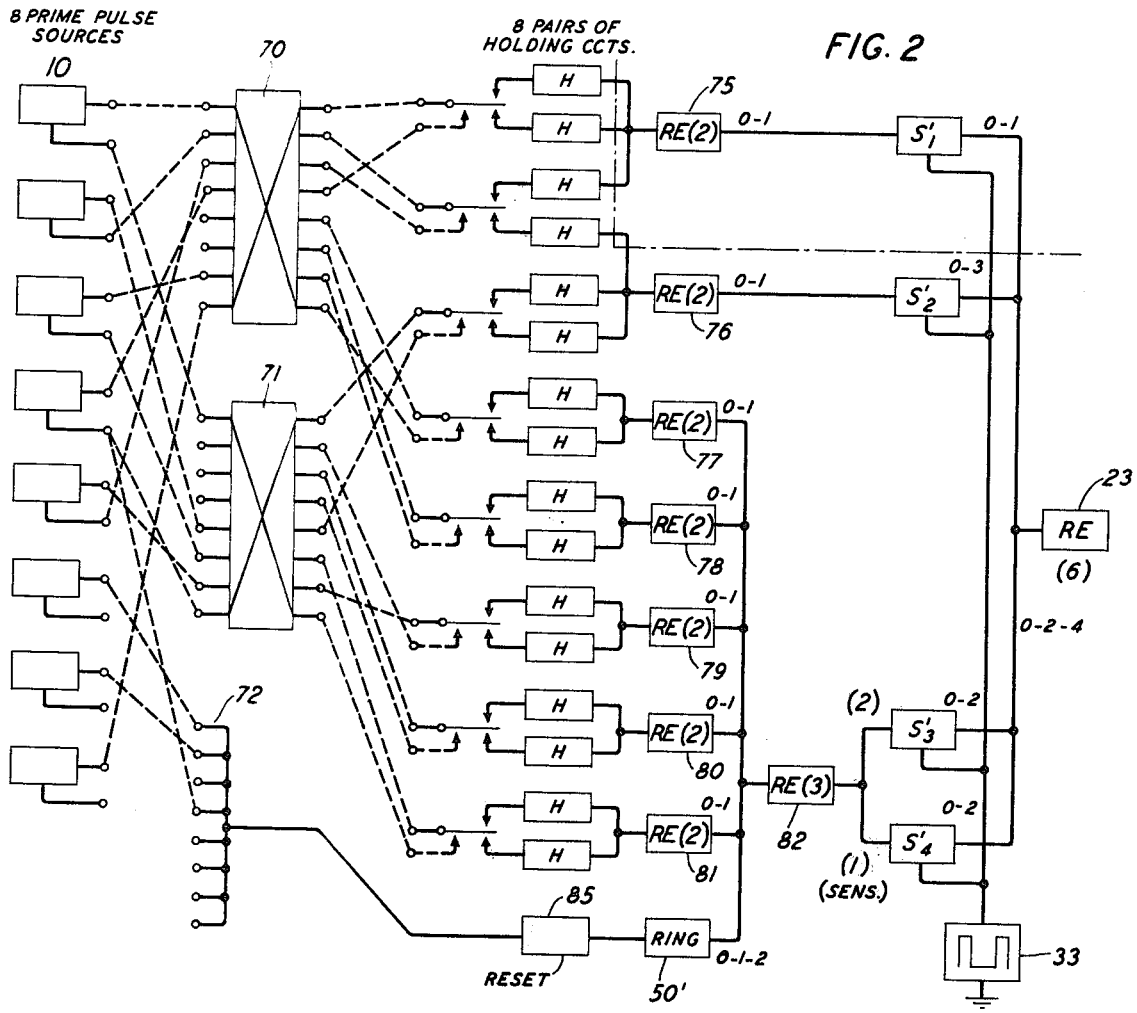
FIG. 2
FIG. 2A
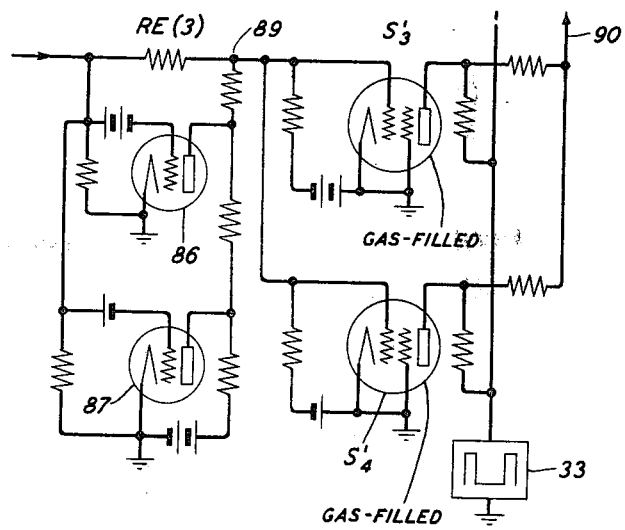
FIG. 3
INVENTOR
D.K. GANNETT
BY
ATTORNEY

SECRET COMMUNICATION SIGNAL GENERATING SYSTEM

The present invention relates to the production of highly irregularly occurring currents under control of mechanism operating with regularity and in reproducible manner. One purpose for such currents is in connection with secret signaling where these currents can be used for keying the outgoing signals and unkeying the received secret signals. For such use it is important in some kinds of signaling, such as in telephony, to be able to generate the key currents in duplicate at distantly separated transmitting and receiving points at the time of use and in continuous manner to enable the enciphering and deciphering operations to be currently carried out.

The object of the invention is to produce substantially randomly occurring currents in continuous succession and in reproducible form, in reliable and relatively simplified manner.

The invention will be disclosed as employing component apparatus of the type disclosed in my prior application Ser. No. 555,913, filed Sept. 27, 1944, and the general plan is similar but the present disclosure represents considerable simplification over the system disclosed in that application and is based upon certain rules for combining component signals or pulses that are believed to be novel.

The invention and its features and objects will appear more fully from the following detailed description in connection with the attached drawing in which:

FIG. 2 is a similar diagram showing a modification of the system of FIG. 1;

FIG. 2a shows a detail modification of a part of the system of FIG. 2 which can be substituted for that part of FIG. 2 to the right of and above the broken line; and FIG. 3 shows a detail circuit diagram of certain parts of FIG. 2.

Figure 1:
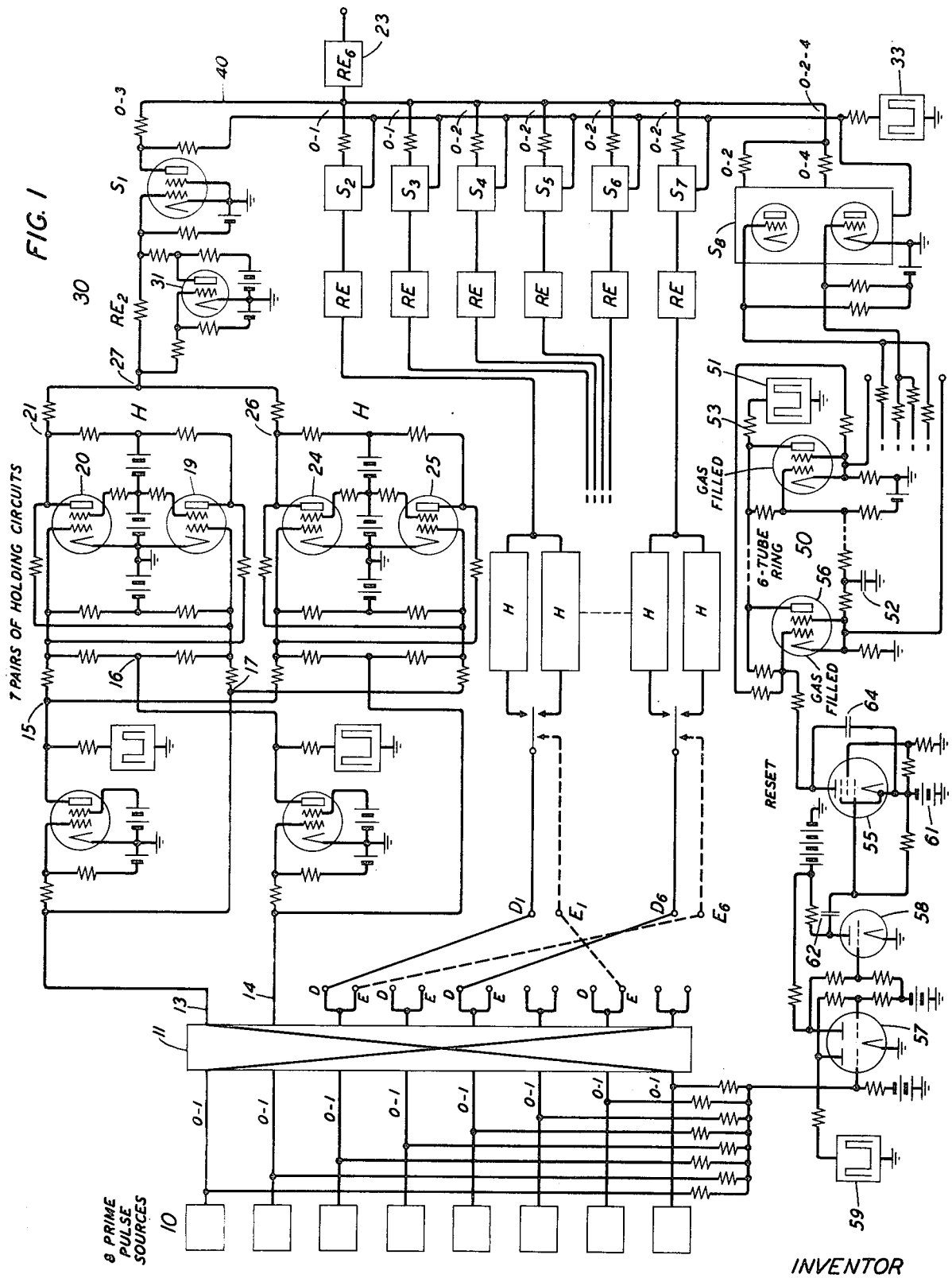
FIG. 1 is a schematic circuit diagram, partly in block form, of a key generating system embodying the invention in one form.

The key generator disclosed in this application was devised with specific reference to the type of secrecy system disclosed in R. L. Miller application Ser. No. 542,975, filed June 30, 1944. In that system the input speech signals are analyzed into low frequency speech-defining signals in a number of separate circuits such as ten circuits. These speech-defining signals are then each separately enciphered by combining key currents with them to render the transmission secret. These enciphered signals are simultaneously transmitted on a multiplex basis to the reception point where they are separately deciphered by combination with key currents which are identical with the key currents used for enciphering the signals at the transmitter.

With the type of transmission used according to the Miller disclosure, six signal values, 0 to 5 steps inclusive, are recognized and used to convey the intelligence, this choice of six values being considered as substantially optimum from the standpoint of the various practical considerations involved. The key currents that are used are likewise six-valued currents having the range 0 to 5 steps. These key currents are supplied at the rate of 500 pulses per second and they should, for the degree of secrecy sought, vary in magnitude in as nearly as possible random manner.

In order that identical key pulses may at all times be supplied at both the transmitting and receiving points the Miller disclosure employs duplicate recorded key material. Where the keys are supplied from independently operating key generating systems, as in the present disclosure, it is necessary to start out in the key generating process with pulses that can be reproduced mechanically in reliable manner and that therefore are not of random character. The problem is to build from these initial pulses the final key pulses of practically random character in ways that can be reliably and continuously duplicated at separated points. This was also the problem in my prior application referred to, the present invention providing an alternative key generating system offering considerable saving in equipment because of the novel method of constructing the final key currents from the component currents. The theory and principle upon which the novel scheme of constructing the key pusles depends will be set forth at a later point after the illustrative examples of key generating systems using the principle have been described.

Referring to FIG. 1, a plurality of prime pulse sources, such as eight in number, are provided at 10 for generating two valued signals having the values 0 and 1, which are, therefore, similar to spacing and marking signals. In one form these sources may be discs all mounted for rotation from the same driving motor and each having a circular row of holes irregularly spaced in a circle around the disc with provision for projecting light through the holes onto a photoelectric cell placed on the opposite side of the disc. When a hole is presented to the light beam a pulse is generated and when a blank is presented no pulse is produced. This type of pulse source is disclosed in A. E. Melhose application Ser. No. 555,912 filed Sept. 27, 1944, now U.S. Pat. No. 3,891,799, which issued on June 24, 1975, and the sources 10 of the present disclosure may be similar in construction to the Melhose application disclosure. The number of spacing and marking signals generated in one revolution by any one disc is made slightly different from the number generated by any other disc, these numbers being prime to one another, so that the total cycle of repetition of the eight discs is relatively long.

The leads from the primary pulse sources 10 are carried through an interconnecting panel 11 where they may be cross-connected in any desired manner to eight output terminals on the opposite side of the panel. These cross-connections may be changed from time to time manually or under control of relays to change the code.

Seven pairs of holding circuits are provided, each indicated H on the drawing, these being of the same type as disclosed in my prior application referred to. As indicated symbolically in connection with the lower six pairs, the input connections to each pair of holding circuits include an upper or solid line lead which is a control lead and a lower or dotted line lead ending in an arrow to indicate its function as a swtiching lead to determine whether the control pulse received over the control lead are impressed on the upper or lower holding circuit. Actually the switching is electronic and the circuit of the upper pair of holding circuits has been shown to indicate how the control is effected. It is assumed that the marking pulses from the prime sources are positive in polarity. A pulse on lead 13 accompanied by no pulse on lead 14 would find point 16 at high positive potential and would render point 15 low in potential and point 17 high in positive potential. Under these circumstances tube 19 has its input grid made highly positive and this tube transmits saturation current. The cross-connection from the anode of tube 19 to the input grid of tube 20 aids in cutting that tube off, throwing point 12 to high positive potential. That is, the pulse on lead 13 determines whether or not tube 19 or 20 is cut off while the absence of a pulse on lead 14 determines that the control by the pulse received from lead 13 is exercised on the upper rather than the lower holding circuit of this pair. Had a pulse been assumed present on lead 14 the pulse on lead 13 would have resulted in cutting off tube 24 while absence of a pulse on lead 13 would have resulted in cutting off tube 25. It should be observed that the holding circuit opposite that one of the pair which is placed under control of the pulses on lead 13 remains unaffected while the controlled holding circuit is receiving such pulses. For example, if tube 20 was cut off by the last pulse applied to the upper holding circuit from lead 13, it remains in this condition during such time as pulses from lead 13 are being applied to the lower holding circuit of the pair. The potential of the common output point 27 may, then, have any one of three values, 0, 1 or 2 according as points 21 and 26 are both at zero voltage, or one at high positive potential and the other at zero, or both are at high positive potential.

The upper pair of holding circuits are permanently connected to the upper pair of leads 13, 14 but the other six pairs have their control terminals $D_1$ to $D_6$ connected in any desired order to the D terminals on the output side of panel 12, one to each, and their switching terminals $E_1$ to $E_6$ connected in any order to the E terminals, one to each, with the proviso that the D and E terminals of the same pair of holding circuits are never to be connected to the D and E terminals derived from the same pulse generator lead.

Each pair of holding circuits has its common output terminal 27 connected to a reentry circuit 30 which reenters at step 2. Following each reentry circuit is a stepper circuit, these being indicated at $S_1$ to $S_7$. These are all alike in operation but have different step values of output current. If point 27 has a potential of either the value 0 or 2 steps or units, stepper circuit $S_1$ is unoperated, and puts out a pulse of step 3 value into common output branch 40. This step value is determined by the value of the resistances used in the circuit. If the potential at point 27 equals 1-step in value, stepper $S_1$ fires and puts out step-0 voltage into the output lead 40. Reentry tube 31 is normally biased to cut-off and remains cut off until the value of voltage at point 27 exceeds one step. Then the grid bias is overcome and tube 31 passes saturation current reducing the potential applied to the stepper grid to the point where the stepper fails to fire when its plate voltage goes positive under control of pulsing supply 33. In this way the stepper is operated only on one step of applied pulse, zero value being insufficient to allow the stepper to fire and 2-step value causing the reentry tube to pass current and reduce the stepper grid voltage below the firing value. The pulsing supply 33, and the other pulsing supplies indicated on the drawing, operate in selected time sequence such that each succeeding group of discharge devices having such supplies have positive pulses applied to their anodes in appropriate time sequence for the pulses incoming to the control electrodes thereof, as disclosed in greater detail in my aforementioned application Ser. No. 555,913.

The other reentry circuits in the group 30 act similarly in relation to the individual steppers $S_2$ to $S_7$ which are alike except for the values of resistances used in their outputs, these being proportioned to give the step values noted on the drawing in connection with each.

The steppers $S_1$ to $S_7$ each put out 2-valued pulses into the common output. The stepper $S_8$ puts out 3-valued pulses, having step values 0–2–4, and for this reason it consists of a pair of gas-filled tubes arranged to fire one at a time to give either a step-2 or step-4 output, or in case neither fires, to give step-0 output. Stepper $S_8$ is operated in irregular manner under control of a ring circuit 50 shown as comprising six stages.

This ring circuit may be the same in construction and operation as the ring designated the P-ring in my prior application referred to. It comprises gas tubes, one per ring stage, of which the first and last are shown, with, in this case, a source 51 of pulsing plate supply voltage. Individual outputs are taken off the cathodes of the stages. Each stage is coupled to the next by a circuit including a condenser 52 which receives a charge when the preceding tube fires and places a positive bias on the grid of the next succeeding tube so that on the next pulse of plate voltage the next stage fires. As soon as any stage fires it draws current through the common plate resistor 53 which lowers the plate voltage of all other stages below the ignition level. Condenser 52 is associated with resistors of such value as to give the required timing for the interstage functioning.

The ring circuit is shown provided with a resetting circuit which is specifically different from that shown in my prior application. The purpose of this is to reset the ring circuit to zero at short intervals to avoid errors that would result from the rings at different stations getting out of step. In the arrangement shown, the ring is reset to zero every time a space is produced by all eight of the primary pulse sources 10 at the same time. This occurs sufficiently often to avoid disturbing the transmission in case the rings get out of step for some reason. The reset circuit shown comprises tube 55 for removing bias from the grid of the first stage tube 56 when all eight leads from the discs have zero voltage on them during a pulse period. This condition is detected by the circuit comprising tubes 57 and 58. During each pulse period, positive plate voltage from pulsing source 59 is applied to the left half of tube 57. If at this time any disc is generating a pulse, the left grid of tube 57 is sufficiently positive to allow saturation current to pass, cutting off the right half and maintaining tube 58 in its normally saturated condition. This produces no change in the bias on tube 56 since tube 55 is transmitting saturation current and applying normal bias to the grid of tube 56 from source 61. If all disc outputs are zero, however, the left half of tube 57 transmits no space current when the power voltage comes on. The plate voltage is, therefore, highly positive and causes the right half of the tube to pass saturation current and cut off the current through tube 58. The resulting high plate potential of the latter causes condenser 62 to charge in series with the grid-cathode space of tube 55. This has no effect on the bias on tube 56 since tube 55 was already passing saturation current. At the end of the pulse, however, when the plate voltage of tube 57, left half, goes off, the right half of tube 57 becomes cut off allowing tube 58 to saturate and this drives the grid of bias control tube 55 highly negative beyond cut-off removing the negative bias from the grid of tube 56, normally applied from battery 61 through tube 55. When the plate voltage is again applied from source 51 to the ring tubes, tube 56 will fire before any other ring tube can fire and prevents the firing of any other ring tube by drawing current through resistor 53 as already explained. A small condenser 64 is shown shunted across the plate-cathode path of tube 55 to maintain negative bias on the grid of tube 56 until the end of the plate pulse from source 51. This may be desirable since in practice the plate pulse from source 59 may be set to end before the end of the plate pulse from source 51.

Considering the output voltages derived from the ring circuit, these may be used in various ways to control the stepper $S_8$. On the average this stepper should put out each of its three values of voltage 0, 2 and 4 steps, one-third of the time. Assuming that these are to be put on in the sequence 0, 2, 4, 4, 2, 0, the first and last output leads from the ring are unused, the second and fifth leads are connected through individual voltage adding resistors to a common point which is connected to the grid of the upper stepper tube of the pair, this tube giving output values 0 and 2 steps. The third and fourth leads are similarly used to control the other stepper tube of the pair giving output values of 0 and 4 steps.

Reentry 23 may be the same as reentry 23 of my prior application referred to and it may serve, as in that disclosure, to reenter not only the key itself but the summation of key plus signal values, the latter received from the message stepper of the system. This reentry has reentry points at 6, 12 and 18 steps of applied current.

There are several requirements of a satisfactory composite key, the principal ones being the following four requirements:

1. The several key values (e.g. six) should appear with as nearly equal frequency as possible.

2. The correlation between the key values and each of the component signals should be as small as possible. Stated differently, the likelihood should be the same on each key value that a marking pulse has occurred on any given component.

3. Each key value should be equally likely to be followed by the same or any other value.

4. There should be a minimum correlation between changes between successive key signals and changes between successive signals of any component.

Experience has shown that a least two 2-valued signals and one 3-valued signal are needed to construct a good 6-valued key. The best values for these are: one 2-valued signal weighted 0–1;and 2-valued signal weighted 0–3; and a 3-valued signal weighted 0–2–4. When these signals individually have distributions nearly enough random and are combined and reentered at value 6, a practically perfect key is obtained.

Referring to FIG. 1, it is seen that stepper $S_1$ produces a 0–3 component, stepper $S_2$ (or $S_3$) produces a 0–1 component and stepper $S_8$ produces a 3-valued signal, 0–2–4. If only these three components were used, each component would need to approach random distribution to make a practically perfect key. With less random components, a more uniform distribution is obtained by adding in other 2-valued signals as provided by the steppers $S_3$, $S_4$, $S_5$, $S_6$ and $S_7$.

The reason why a 3-valued signal is needed is that 2-valued signals alone cannot be combined to form a perfectly distributed 6-valued key since $2^n$ is not exactly divisible by 6. The 3-valued signal or component need not have a very irregular distribution in itself in order to equalize the distribution of the key values. A further important function of the 3-valued signal is to make it difficult to identify the portions of intercepted line signals which consist of pure key, that is, that are sent out during pauses in the speech. For this purpose the 3-valued signal need not have a highly random distribution, and the provisions disclosed in FIG. 1 for supplying the 3-valued signal are sufficient for a practically satisfactory key. If the 3-valued signal (0–2–4) has perfect distribution, or if any two of its components occur randomly, it will give, when added to the 0–1 and 0–3 signals and reentered, perfect distribution of key values and zero correlation between the components and the key values.

Referring to FIG. 2, each of the eight prime pulse sources 10, such as perforated discs is provided with two outputs as indicated. The second output can be obtained by duplicating the light source and photoelectric cell referred to for giving the single output from the discs of FIG. 1, the second or duplicate set being positioned a suitable angular distance from the first so that the same sequence of mark and space signals are produced as from the first set but displaced in time by a suitable amount. This is suggested merely in the interest of economy in equipment. This simplification is made permissible by the nature of the key producing circuits used following the discs.

Two panels 70 and 71 are used each having eight input terminals facing the pulse sources 10 and eight terminals on their output or opposite sides. In a conference system of the type disclosed for example in my prior application Ser. No. 592,964 filed May 10, 1945, each panel 70, 71 may comprise a set of multi-contact relays operated selectively in accordance with the particular distant communicating station to connect the input panel terminals to the output panel terminals in a particular manner to determine the proper code to be used in communicating with such distant station. Otherwise, panels 70, 71 may represent cross-connecting panels of the type described in connection with panel 11 of FIG. 1. All 16 disc output terminals are patched to the input terminals of panels 70, 71 in such manner that the two signals actuating any pair of holding circuits are always obtained from different discs. In this case eight pairs of holding circuits are used instead of the seven pairs used in FIG. 1 but the holding circuits themselves are identical in construction and manner of operation to those of FIG. 1.

A third terminal group shown at 72 consists of eight terminals, each one of which is patched to one of the two output terminals of a different disc in each case.

Referring again to the holding circuits, the eight output terminals from panel 70 are connected to four of the pairs of holding circuits, following the rule above-stated that the pair of leads connecting to the same holding circuit are derived from terminals of different discs. In like manner, the eight output leads from panel 71 are connected to the remaining four pairs of holding circuits.

The output signals from the upper three holding circuits are applied to reentry circuit 75 and the signals from the next lower three holding circuits are applied to reentry circuit 76. These deliver through steppers $S_1'$ and $S_2'$, respectively, the odd-valued signals 0–1 and 0–3 into the output reentry circuit 23. The remaining five pairs of holding circuits have their outputs reentered in pairs by reentry circuits 77 to 81 to give five 2-valued signals (0–1) which are then added together and reentered at step 3 by reentry circuit 82 to form a 3-valued signal. This is translated by means of steppers $S_3'$ and $S_4'$, into a 3-valued signal (0–2–4), stepper $S_3'$ responding to input signals of two steps or greater value and when responding delivering a step-0 output signal (otherwise a step-2 output), and stepper $S_4'$ responding to input signals of one step or greater value and delivering a step-0 output when responding (otherwise a step-2 output). If neither stepper $S_3'$ nor $S_4'$ responds, their combined output has step-4 value.

In order to give a more nearly uniform distribution of the 3-valued signal, a ring circuit 50' is used, similar to ring circuit 50 of FIG. 1 and delivers step-0 output for one-third of the time on the average, step-1 output of one-third of the time and step-2 output for the remaining third of the time. This ring circuit is provided with a reset circuit 85 similar to the reset circuit of FIG. 1 and operating in similar manner to reset the ring circuit 50' to zero every time a space appears simultaneously on all eight terminals in bank 72.

It is seen that the FIG. 2 circuit represents a straightforward combination of two 2-valued signals, 0–1 and 0–3, and a 3-valued signal, 0–2–4 to give a 6-valued key, and that each of the mentioned component signals is given a sufficiently random character and uniform distribution to produce a practically random key without the introducing into the final reentry circuit 23 any further component signals.

The manner in which different sensitivities can be given to the steppers $S_3'$ and $S_4'$ is indicated in FIG. 3, which also shows the reentry circuit 82 in detail.

The reentry circuit comprises the two vacuum tubes 86, 87 with stepped bias voltages derived from the grid batteries shown. It will be seen from FIG. 2 that the maximum value of current applied to the input of reentry circuit 82 is seven steps. This circuit must, therefore, reenter at two values, 3 and 6 steps, in order to provide output current of no greater value than step 2. When the input is of less than three steps, it does not overcome the negative bias of either tube 86, 87 and both tubes remain cut off. Under this condition the potential at point 89 is merely that due the input signal since with no input signal present point 89 is at ground potential, due to a proper proportioning of the various resistances in relation to the battery voltages used. When the input increases from a step-2 value to step-3 value, however, the bias on tube 87 is exceeded and that tube passes saturation current and lowers the potential at point 89 by three steps reducing to zero the potential at that point. Similarly, when the input increases from step-5 to step-6 value, the bias on tube 86 also is exceeded causing that tube to subtract another three steps of voltage from that existing at point 89, again reducing the voltage at point 89 to zero.

The steppers $S_3'$ and $S_4'$ are supplied with interrupted plate voltage from source 33, these steppers using gas-filled tubes. Their grid circuits are provided with different bias voltages whereby $S_4'$ will fire on one step of applied voltage and $S_3'$ will fire on two steps of voltage. Since the applied voltage for these steppers always has a value of either step-0, step-1 or step-2, either both steppers fail to fire, or one or both steppers fire. If neither fires, the output at 90 is maximum and is adjusted by the output resistances to have step-4 value. If only stepper $S_4'$ fires, the potential at 90 is reduced to a value of step-2 and if both steppers fire the output has step-0 value. The output will have each of these values one-third of the time on the average as already noted.

FIG. 2A shows an alternative type of output circuit for the upper two pairs of holding circuits. With this alternative wiring, reentry 75 and stepper $S_1'$ are both omitted and each of the upper four holding circuits is individually connected directly to the input of final reentry circuit 23. Reentry circuit 76 then has only two input branches instead of three.

What is claimed is:

1. A key generating circuit for constructing a six-valued key by combination of signals of smaller ranges of values comprising means to produce two-valued signals of highly irregular occurrence, one signal having the values 0 and 1 unit, and the other having the values 0 and 3 units, means to produce a three-valued signal having the values 0 and 2 and 4 units occurring in irregular sequence, means to combine all of said signals in additive manner, and means effective when the summation signal has the value 6 units or a greater value for reducing such value by 6 units.

2. The method of generating a six-valued key comprising producing highly irregularly occurring mark-space signals in each of a plurality of circuit branches, weighting all of the mark signals in one branch to have unity value, weighting all of the mark signals in another branch to have a three-unit value, and weighting all of the mark signals occurring in another branch to have a value of two units or a multiple thereof, adding the signals in said branches and reentering the summation signals at a value of six units.

3. The method of generating a six-valued key comprising separately producing two-valued signals having the values 0 or 1 unit and two-valued signals having the values 0 or 3 units and three-valued signals having the values 0 or 1 or 2 units or an even multiple thereof including 0 or 2 or 4 units, combining said signals additively and reentering the summation signals at the value six units.

4. The method as defined in claim 3 including the further step of improving the uniformity of distribution by also generating other two-valued signals of values 0 or 1 unit and 0 or 2 units and adding these into said summation signals before reentering.

5. The method of generating a six-valued key comprising separately generating two binary signals each of a different odd unit value alternating with zero in substantially fortuitous manner, and separately generating a ternary signal having zero as one value and even unit values as the other values occurring also in substantially fortuitous manner, adding said binary signals and said ternary signal to give a summation signal and reentering said latter signal at the six-unit value.

6. In a key generating system, a multiplicity of pulse generators each producing two-valued signals in cycles of different length in irregular order within the cycle, holding circuits irregularly operated individually under control of signals from said generators, said holding circuits combining in their outputs currently produced signals combined with signals held over from a previous signal interval for irregular lengths of time, means to weight the output signals from certain of said holding circuits to have zero or unity value and to weight the output signals from other holding circuits to have zero or three-unit value and to weight the output signals from still other of said holding circuits to have one of three values, 0 or 2 or 4 units, and means to combine said weighted pulses into a six-valued key.

\* \* \* \* \*